United States Patent
Kuchta et al.

(10) Patent No.: US 6,732,854 B2
(45) Date of Patent: May 11, 2004

(54) BRISTLE BED CLEANER AND METHOD

(75) Inventors: Richard Kuchta, Shickshinny, PA (US); Tim Vander Vos, South Windsor, CT (US); Steve Venditti, Newton, MA (US); Joseph Vivirito, South Windsor, CT (US); John Genereux, Norwood, MA (US)

(73) Assignee: Gerber Technology, Inc., Tolland, CT (US)

( * ) Notice: Subject to any disclaimer, the term of this patent is extended or adjusted under 35 U.S.C. 154(b) by 23 days.

(21) Appl. No.: 10/003,313

(22) Filed: Nov. 15, 2001

(65) Prior Publication Data

US 2003/0089579 A1 May 15, 2003

(51) Int. Cl.[7] .............................................. B65G 45/00
(52) U.S. Cl. ...................................................... 198/495
(58) Field of Search ......................................... 198/495

(56) References Cited

U.S. PATENT DOCUMENTS

| | | | | |
|---|---|---|---|---|
| 3,819,032 A | * | 6/1974 | Preuss et al. ............... | 198/495 |
| 4,306,475 A | | 12/1981 | Stefanic et al. | |
| 4,345,496 A | * | 8/1982 | Pearl ........................... | 83/100 |
| 5,062,334 A | | 11/1991 | Killilea et al. | |
| 5,211,092 A | | 5/1993 | Blasi | |
| 5,361,453 A | * | 11/1994 | Gerber ........................ | 15/308 |
| 5,412,836 A | * | 5/1995 | Kuchta ........................ | 15/308 |
| 5,582,866 A | | 12/1996 | White | |
| 5,647,092 A | * | 7/1997 | Miwa .......................... | 15/346 |
| 5,660,145 A | * | 8/1997 | Rumbaugh .................. | 119/440 |
| 5,746,302 A | * | 5/1998 | Bowman ..................... | 198/496 |
| 5,836,224 A | * | 11/1998 | Gerber ......................... | 83/22 |
| 6,058,556 A | * | 5/2000 | Jones .......................... | 15/302 |
| 6,135,267 A | * | 10/2000 | Straub ........................ | 198/495 |
| 6,164,751 A | | 12/2000 | Griffin et al. | |

* cited by examiner

Primary Examiner—Richard Ridley
(74) Attorney, Agent, or Firm—McCormick, Paulding & Huber LLP

(57) ABSTRACT

A bristle cleaner station for a conveyorized sheet material cutting machine includes a plurality of air jets that direct pressurized air between downwardly extending bristles of a bristle bed to dislodge debris; and a vacuum chamber adjacent to the bristles to draw away the dislodged debris. The preferred embodiment uses air needles that extend into downward extending bristles to riffle or bend the bristles, making an enlarged space between them. The air needles direct pressurized air into the enlarged space to dislodge debris, and an upwardly open vacuum channel adjacent to the air needles and bristles collects the dislodged debris. A method to clean bristle beds is also disclosed whereby pressurized air is directed between the bristles and vacuum draws away dislodged debris.

15 Claims, 6 Drawing Sheets

BRISTLE BED CLEANER AND METHOD

FIELD OF THE INVENTION

This invention relates generally to an apparatus and method for cleaning debris from a permeable support surface. It is specifically directed toward cleaning debris from between bristles that form the surface of a bristle bed cutting table.

BACKGROUND OF THE INVENTION

Bristle bed support surfaces have become commonplace in the garment industry. Typically, vacuum is applied from underneath a bristle bed support surface to positively hold down a lay-up of sheet material upon which a cutter operates. The cutter usually employs a high speed reciprocating blade. The blade cuts through every ply of the lay-up by penetrating through the surface of the bristle bed upon which the lay-up rests. Free ends of the bristles support the lay-up, while a vacuum permeates between the bristles from under the bristle bed and maintains the sheet material in place so cutting operations can be performed thereon. Improvements in bristle beds have led to provisions for at least an endless conveyorized belt of bristle blocks that is movable in a longitudinal direction.

Although improving the cutting operation, the essential gaps between individual bristles and between blocks of bristles tend to trap drill slugs, lint and other debris generated by the cutting process. The hold-down vacuum created in the bed exacerbates this adverse consequence, as the accumulating debris constricts vacuum ports and diminishes the strength and uniformity of the vacuum within the bristle bed so that the sheet material may not be uniformly held in place. This inevitably results in increased error rates due to shifting sheet material. Accumulated debris tends to become impacted between individual bristles, restricting their ability to flex and making them more susceptible to be cut by the blade during normal use. Cleaning this debris is therefore essential to maximizing the operational efficiency of such cutting machines and to extend bristle life.

Thoroughly cleaning bristle beds has historically been a time consuming and labor intensive process. Two types of bristle beds predominate: non-conveyorized bristle beds, and conveyorized bristle beds wherein at least a portion of the bed comprises an endless movable conveyor.

A rake at the take-off end of a conveyorized bristle bed to agitate the bristles in conjunction with a vacuum chamber having openings to suck debris away from the bristles have been employed to remove debris. A lip adjacent to a cleaning vacuum port slightly parts or 'riffles' the bristle free ends, extending the vacuum's reach deeper into the mat. Prior art embodiments perform well within certain parameters, but generally fail to draw out deeply embedded debris. Some operate against gravity and are therefore self-limiting. All of the prior art methods fail to reach debris deep within the bristle bed, and fail to dislodge much of the debris that is entrained by nicks and barbs on the bristles. These nicks and barbs are unavoidably created when the cutter blade penetrates into the bristle bed and nicks the sides of the bristles. Debris clings to these barbs, reducing the effectiveness of prior art cleaning devices.

The debris not removed by the above prior art devices is retained and drawn deeper by the hold-down vacuum itself. If debris is not efficiently cleaned within the first few cleaning cycles, it likely remains embedded within the bristle bed until removed when the cutting table is taken out of service for major cleaning. Retained debris degrades both vacuum strength at the support surface, vacuum uniformity across that surface, and degrades bristle life. Since this debris accumulates, each marginal increase in the efficiency of debris removal results in a marked increase in the time interval between major cleanings of the bristle bed, less machine down time and more productivity per cycle or shift.

Based on the foregoing, it is the general object of the present invention to provide a bristle bed cleaner and method of use that overcomes the problems and drawbacks of prior art cleaners and methods.

SUMMARY OF THE INVENTION

In accordance with the present invention, a sheet material cutting machine having at least one endless belt conveyor is provided. The conveyor defines at least a portion of a bristle bed that includes moveable bristles that define a support surface for sheet material when the bristle free ends extend upwards. Opposite the bristle free ends are bristle root ends, that may be fixedly attached to bristle blocks. A bristle cleaning station is located adjacent to downward extending bristles on the return run of the conveyor for removing debris from between the bristles. The cleaning station comprises a plurality of air jets to direct pressurized air upwardly toward the bristle root ends and a vacuum inlet chamber adjacent to the air jets to draw out and carry away any debris dislodged from between the bristles. The air jets may also be used to extract impacted debris from between downwardly extending bristles.

A method is also disclosed to most effectively use the cleaner means of the present invention. First, the bristle bed is inverted so that the bristles on that segment to be cleaned extend downward. On a conveyorized bed, this occurs on the return run of the conveyor where the free ends of the bristles to be cleaned lie below the root ends. The second step is optional; the downwardly extending bristles are separated or riffled to define an enlarged space between several of the bristles. Third, pressurized air is directed toward the enlarged space to dislodge debris accumulated between the bristles. This pressurized air may also be used to remove impacted debris from the bristles. Finally, a vacuum is created adjacent to the bristle bed near the enlarged space to draw away the dislodged and/or removed debris.

DETAILED DESCRIPTION OF THE PREFERRED AND ALTERNATIVE EMBODIMENTS

Figure 1:
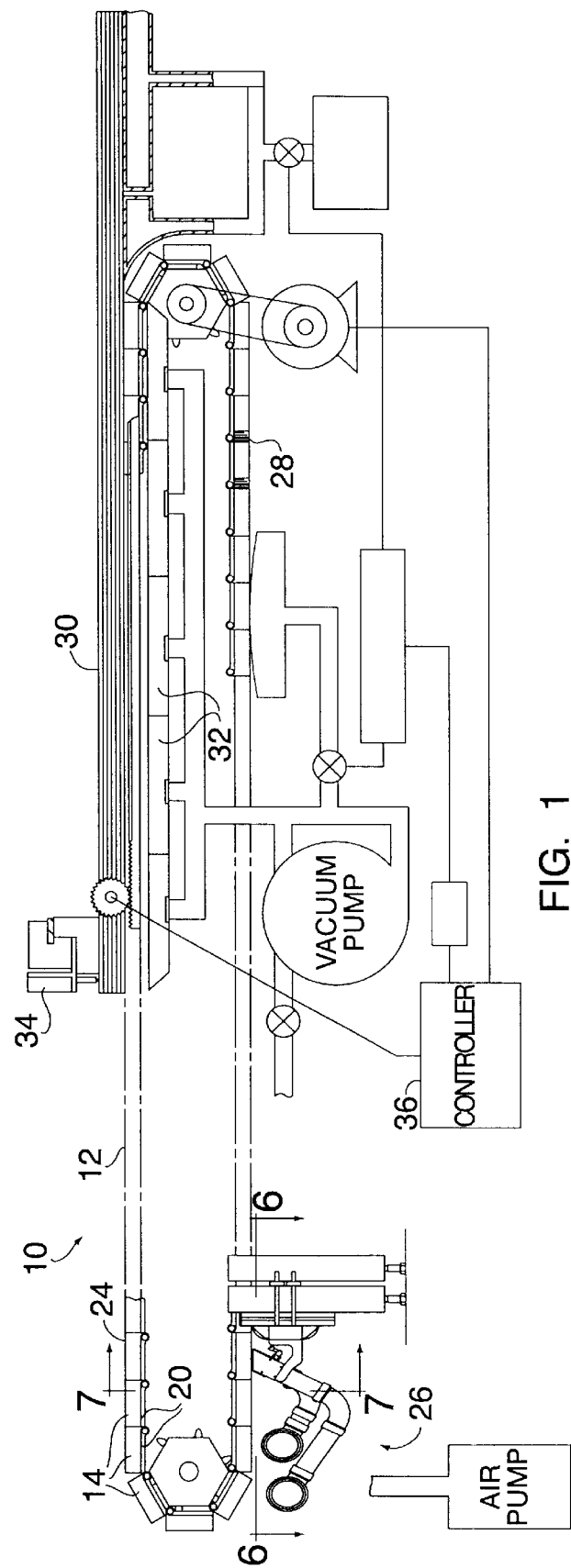
FIG. 1 is an elevational schematic view of a conveyorized bristle bed cutting table, with a preferred embodiment of the cleaning apparatus provided below the bed.

A better understanding of the present invention and its attendant advantages may be realized by reference to the associated illustrations in conjunction with the description below. FIG. 1 shows a sheet material cutting machine 10 in which the inventive improvement is provided. The cutting machine 10 incorporates an endless belt conveyor 12 upon which a series of bristle blocks 14 are mounted. These bristle blocks 14 are collectively referred to as a bristle bed. Depending upon their position on the conveyor 12, each of these bristle blocks 14 comprises a plurality of upwardly extending bristles or downwardly extending bristles fixedly attached at a root end 18 (best seen in FIGS. 2–3) to a base 20 of the block 14.

The free ends 22 (best seen in FIGS. 2–3) of a plurality of bristles define a support surface 24. The conveyor 12 moves the blocks so that downwardly extending bristles 28 (best seen in FIGS. 2–3) run through a cleaning station 26 during the conveyor return run. Downwardly extending bristles are those whose free end is vertically below the base of the block 14. The support surface 24 includes the commonly referred take-on and take-off sections as well as the cutting area of the machine 10. A lay-up of sheet material 30 is placed on the support surface 24, held in place via vacuum chambers 32 drawing air through the bristle bed, and cut by a cutter head 34 that rides on a movable carriage over the lay-up 30. The endless conveyor belt 12 rotates in a generally counterclockwise direction as depicted in FIG. 1; such rotation in either direction herein referred to as longitudinal movement of the bristle bed. A controller 36 coordinates vacuum, cutter movement, and longitudinal movement of the conveyorized bristle bed to cut a plurality of pattern pieces from the lay-up 30.

Figure 2:
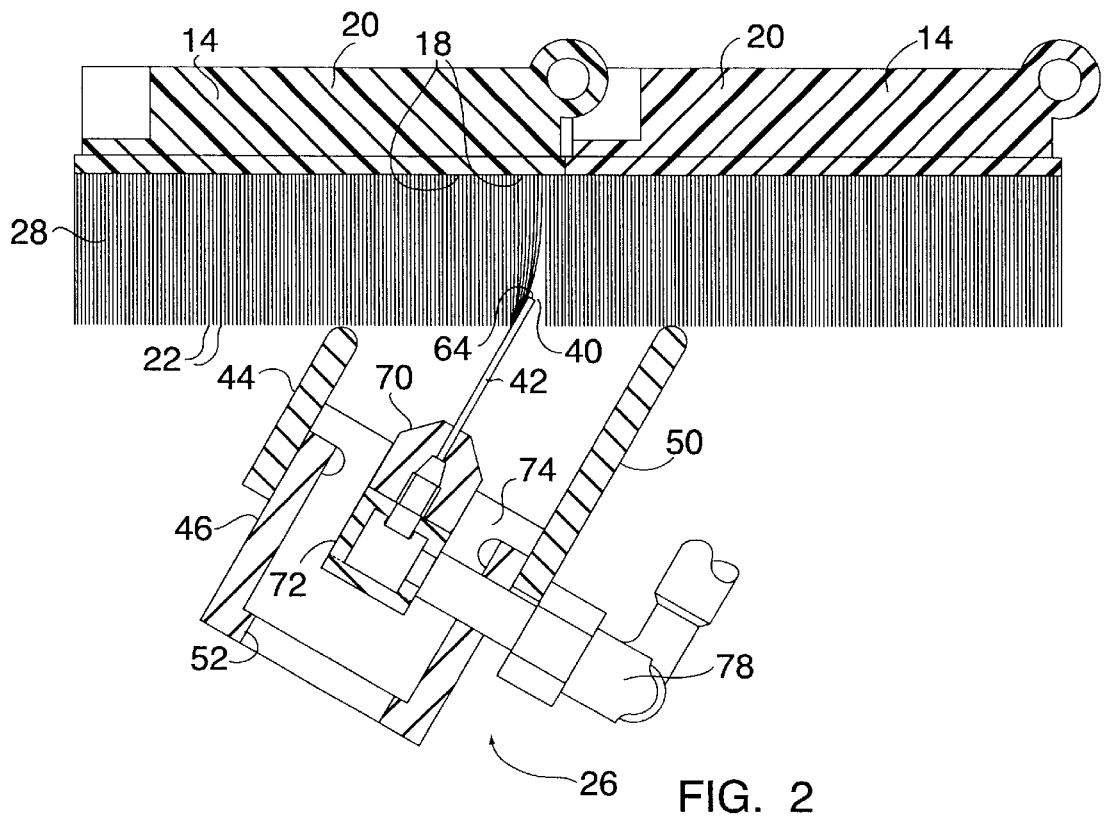
FIG. 2 is a close up cross sectional view of the cleaning apparatus of FIG. 1, showing the pressure and vacuum means operating on downwardly extending bristles.

As the conveyor belt 12 moves longitudinally, each section of bristles eventually reaches the station 26 at the underside of the endless conveyor belt 12 as shown generally at the left side of FIG. 1. The expanded view of this in FIG. 2 shows the cleaning mechanism impacting against the downwardly extending bristles 28 as they move from the left to the right. The preferred embodiment utilizes a series of air needles 42 to direct pressurized air into the bristle bed. While the air needles shown in FIG. 2 are depicted as hollow cylinders with discharge ends 64 that define circular openings through which pressurized air is discharged, their geometry need not be so limited. The air needles 42 may also exhibit discharge ends that define a shape such as an oval, square, pentagon, or other multi-sided hollow trapezoid through which air may pass. These discharge ends 64 may be constricted to form a nozzle. Air jets may also take the form of a conduit extended laterally across a plurality of bristles, such as a narrow vent, which would exhibit a discharge end in the shape of a rectangle. Any of these structures, and others equivalent thereto, fall within the definition of air jets. These air needles 42 also serve to agitate the bristles, and cylindrical air needles 42 as shown have proven effective while requiring significantly less air volume than vent-type arrangements. The air needles 42 preferably span the entire width of the conveyorized bristle bed. The width or lateral direction is perpendicular to the longitudinal movement of the conveyor belt. As shown, the width or lateral direction is perpendicular to the views of FIGS. 1 and 2. The needles 42, 42 thus impinge upon the free ends 22 of a lateral line of downwardly extending bristles 28. This temporarily bends a line of bristles to open an enlarged space 40 between the bent bristles and those unbent bristles immediately adjacent, and that action is herein termed riffling the bristles. This space 40 is enlarged relative to the space between adjacent bristles in their resting position. Pressurized air is blown through a discharge end 64 of the air needles 42 to positively dislodge debris, especially impacted debris nearer to the bristle root ends 18. The discharge end 64 is preferably constricted into a nozzle to increase air velocity as air exits the needle, facilitating deeper and more forceful penetration into the bristle bed.

Figure 3:
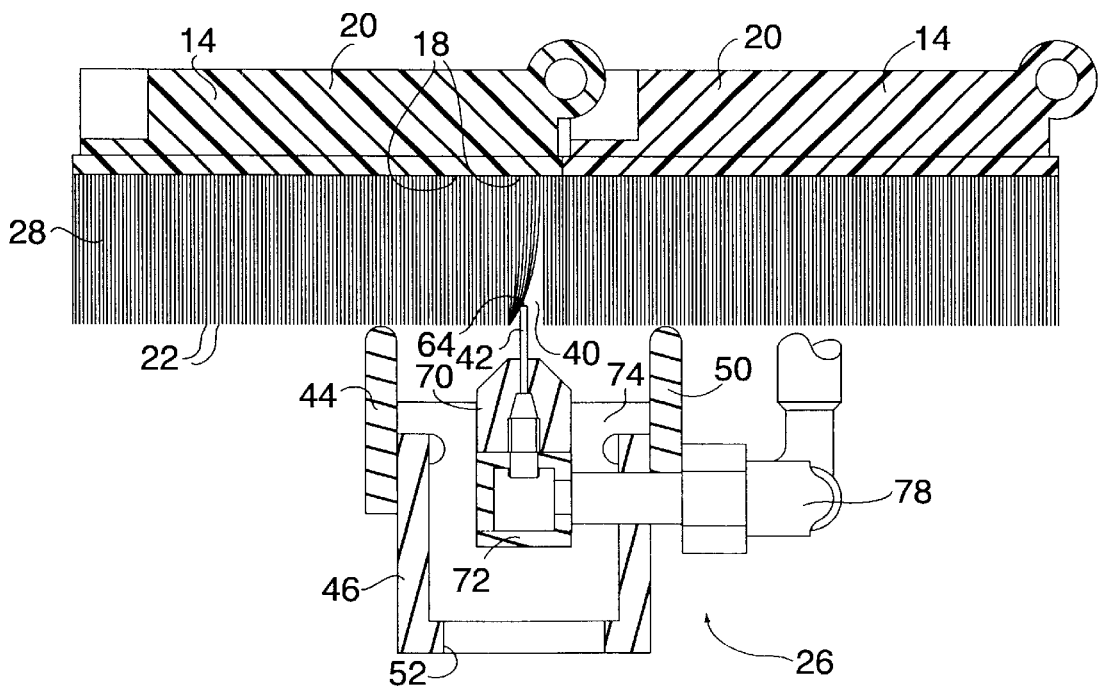
FIG. 3 is a view similar to FIG. 2 showing an alternative embodiment of the cleaning apparatus.
Figure 4:
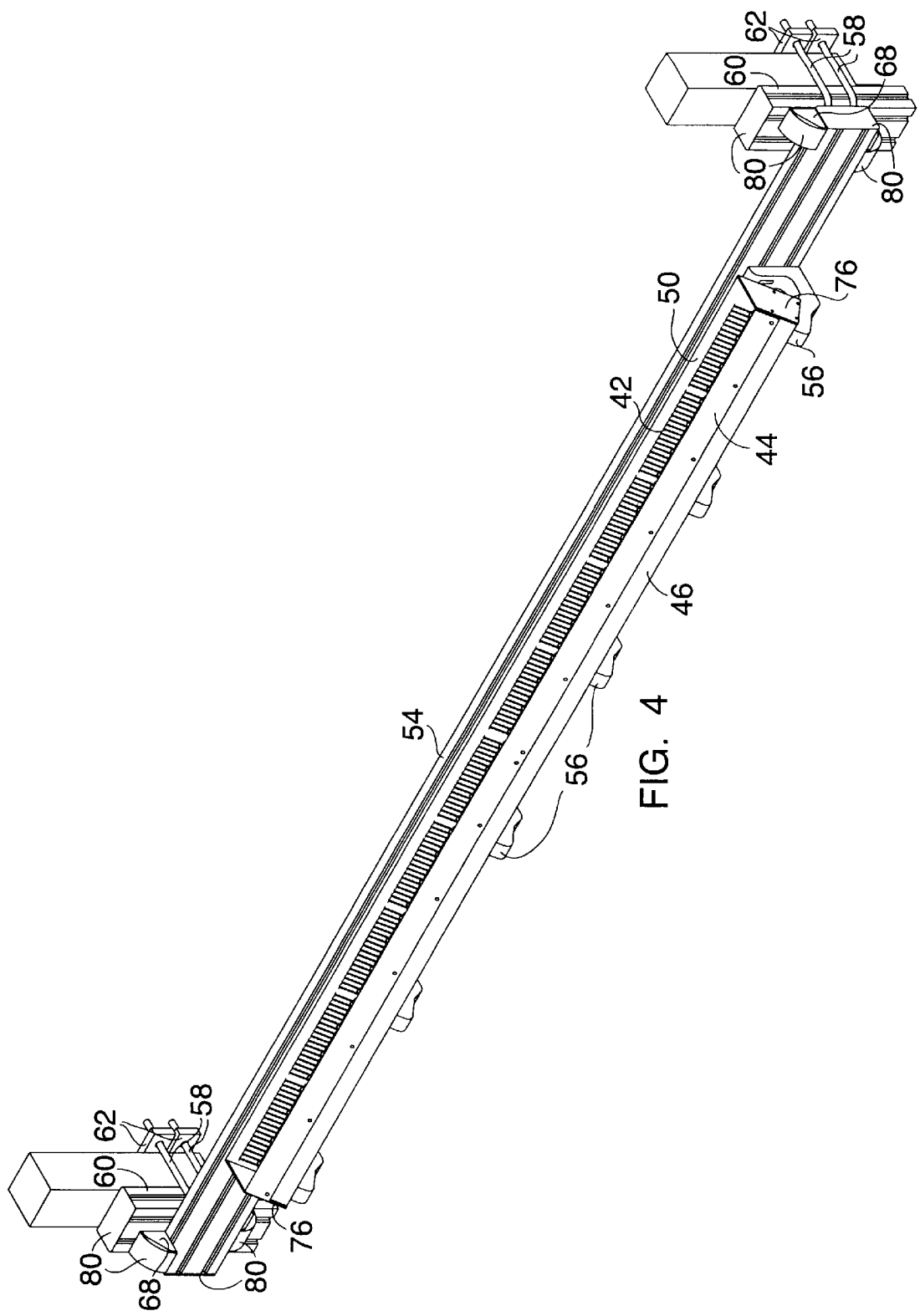
FIG. 4 is a perspective view of the preferred embodiment of the cleaning apparatus in isolation.
Figure 6:
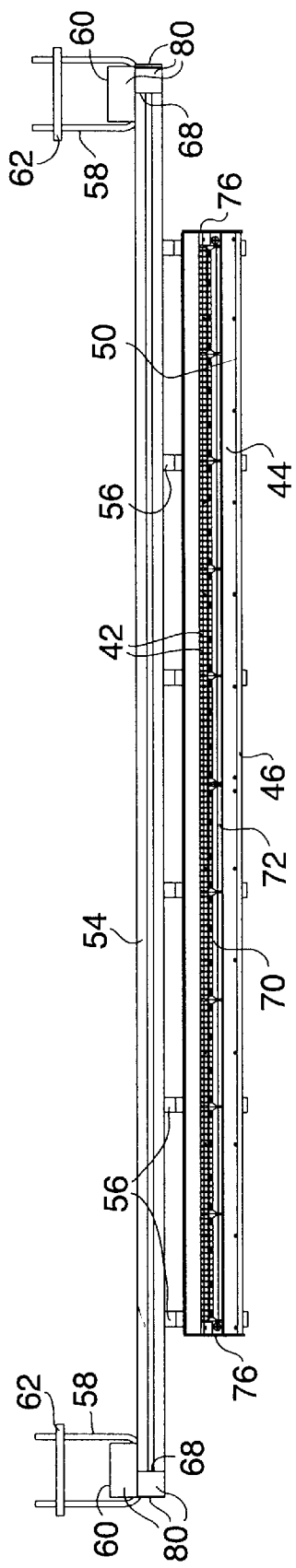
FIG. 6 is a sectional view along the line 6—6 of FIG. 1, absent the vacuum and pressure fittings.
Figure 7:
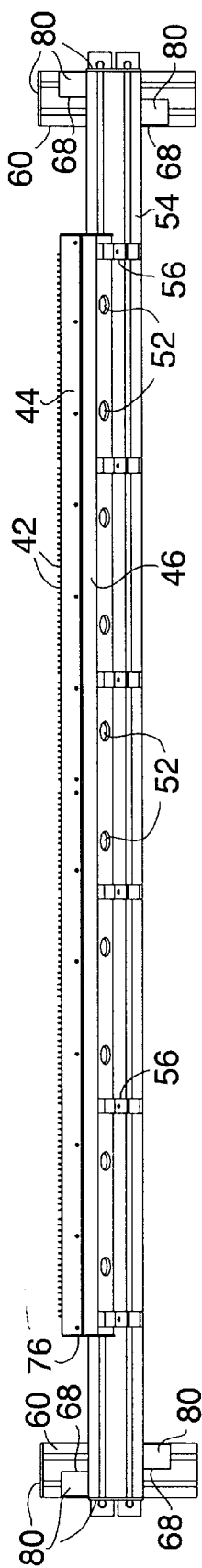
FIG. 7 is a sectional view along the line 7—7 of FIG. 1, absent the vacuum and pressure fittings.

A vacuum inlet chamber 46, depicted as an upwardly open channel in FIGS. 2 and 3, defines opposing sides 44 and 50. The air needles 42 are mounted midway between those opposing sides 44 and 50 and supported in a needle mounting tube 72. The needle mounting tube 72 is itself supported within the vacuum inlet chamber 46 by a plurality of vacuum chamber partitions 74, to be later described in detail. Vacuum is drawn through vacuum ports 52 at the base of the vacuum inlet chamber 46 to draw away the loosened debris. The vacuum provided at the free ends 22 of the downwardly extending bristles 28 is adjacent to the area of the enlarged space 40. As shown in FIGS. 4 and 6–7, the vacuum inlet chamber 46 preferably spans the width of the conveyor belt.

In the preferred embodiment of FIG. 2, the air needles 42 penetrate approximately one half inch into a bed having 1.6" bristles. The air needles 42 are so angled as to mirror the angle at which the bristles are bent, as shown in FIG. 2. The pressurized air exits a discharge nozzle at the end 64 of the air needle 42. Thus, pressurized air is discharged as near the base 20 as possible. The sides of the inlet channel 44 and 50 are canted similar to the angle of the needles for simplicity in assembly.

The pressurized air blown through the air needles 42 interacts with the vacuum drawn by the inlet channel 46 to create a continuous air current to dislodge and draw debris away from the downwardly extending bristles 28. This generates two distinct, generally parabolic air currents. The predominant current is within the enlarged space 40, driven from the air needle discharge end 64 toward the root ends 18 of the bristles, then curving sharply around toward the right hand side of the vacuum chamber 46 nearest the side 50 downstream of the moving bristle bed. The secondary current is upstream (relative to the conveyor movement described) of the primary current, driven similarly from the discharge end 64 toward the root ends 18 of the bristles, but curving sharply back toward the left hand side of the vacuum chamber 46 nearest the side 44 upstream of the moving bristle bed.

The negative pressure from the vacuum inlet chamber 46 draws in the return side of each air current, but the secondary current is severely curtailed by the presence of bunched bristles which tend to dissipate the airflow. The enlarged space 40 leaves a clearer pathway for the predominant air current to follow, and the unbent bristles adjacent to the enlarged space tend to deflect air back toward the vacuum inlet chamber 46, facilitating parabolic flow in that area. While debris is drawn away largely by the predominant air current, much debris appears to be dislodged by the secondary current. This dislodged debris generally remains trapped by the bunched bristles to the left of the air needle 42, but is no longer impacted and will easily fall once the bristles regain their normal spacing. This debris dislodged by the secondary current is readily drawn into the predominant current as soon as that debris encounters an enlarged space 40 from the continuous longitudinal movement of the conveyorized bristle bed. Of course, the much stronger predominant current also dislodges debris not affected by the secondary current.

FIG. 3 shows an alternative embodiment wherein the air needles 42 and the sides 44 and 50 of the inlet channel 46 are oriented in a vertical plane. The needles mounting tube 72 and the vacuum channel partitions 74 are as described above. Pressurized air passing out of a discharge end 64 of an air needle 42 of the embodiment of FIG. 3 immediately strikes against at least one downwardly extending bristle 28 that is bent, limiting air velocity and penetration into the bristles as compared to that achieved in the FIG. 2 arrangement. Both primary and secondary air currents are reduced drastically, and debris removal is markedly less complete than with the embodiment of FIG. 2.

Figure 8:
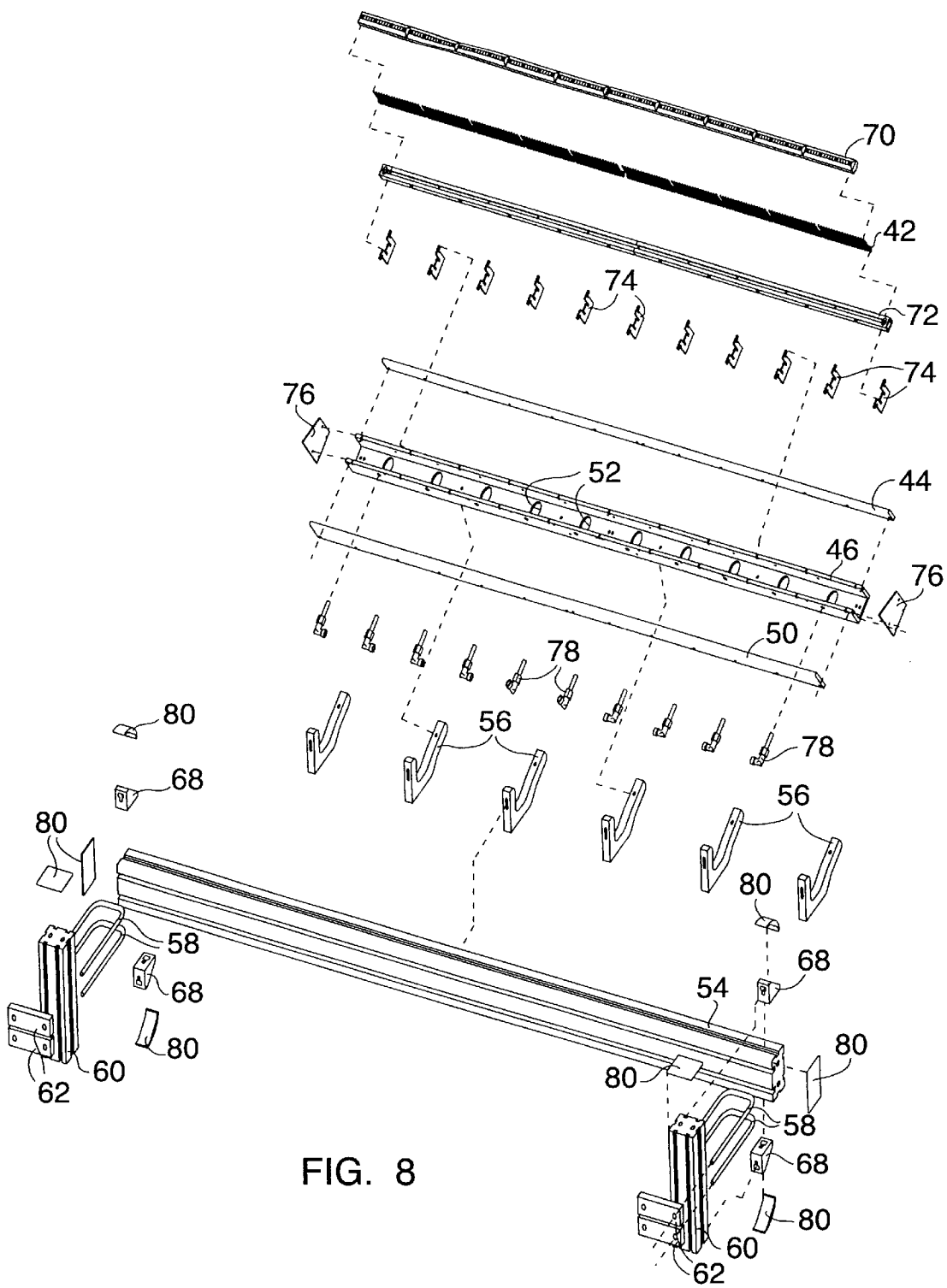
FIG. 8 is an exploded view of the components of the preferred embodiment of the cleaning apparatus.

FIG. 4 presents a perspective view of the present invention in isolation, absent a series of air supply fittings 78 and vacuum fittings 66 to be detailed below. The air needles 42 are arranged seriatim to match the width of the bristle bed upon which they operate. The air needle and vacuum assembly previously described mounts to a cross support 54 via a series of cleaner brackets 56. The cross support 54 is held by U-bolts 58 with associated backing plates 62 to two carriage mounts 60, which themselves are fixed to a stationary portion of the sheet material cutting machine. Vacuum is drawn through a series of vacuum ports 52 (best shown in FIGS. 7 and 8) through the bottom of the inlet channel 46. To prevent obstruction of the vacuum ports 52, the needle mounting tube 72 (as best shown in FIG. 8) upon which the air needles 42 rest is raised off the bottom of the inlet channel 46.

In practice, the outer 7.5%–15% of each lateral side of the bristle mat spends far less time under the cutter head than the central 70%–85% of the bed width, depending upon the particular application. Certain users extend the time between dedicated cleaning of their bristle beds by rotating bristle blocks from the lateral portions of the conveyorized bristle bed with interior blocks that are subject to more intense debris accumulation. The air needles 42 and/or the vacuum inlet chamber 46 need only span this central region for effective cleaning for those such users, though ideally the capacity to clean the entire width of the bristle bed should be retained so as to allow for changing applications that cut over more of the bed surface.

Figure 5:
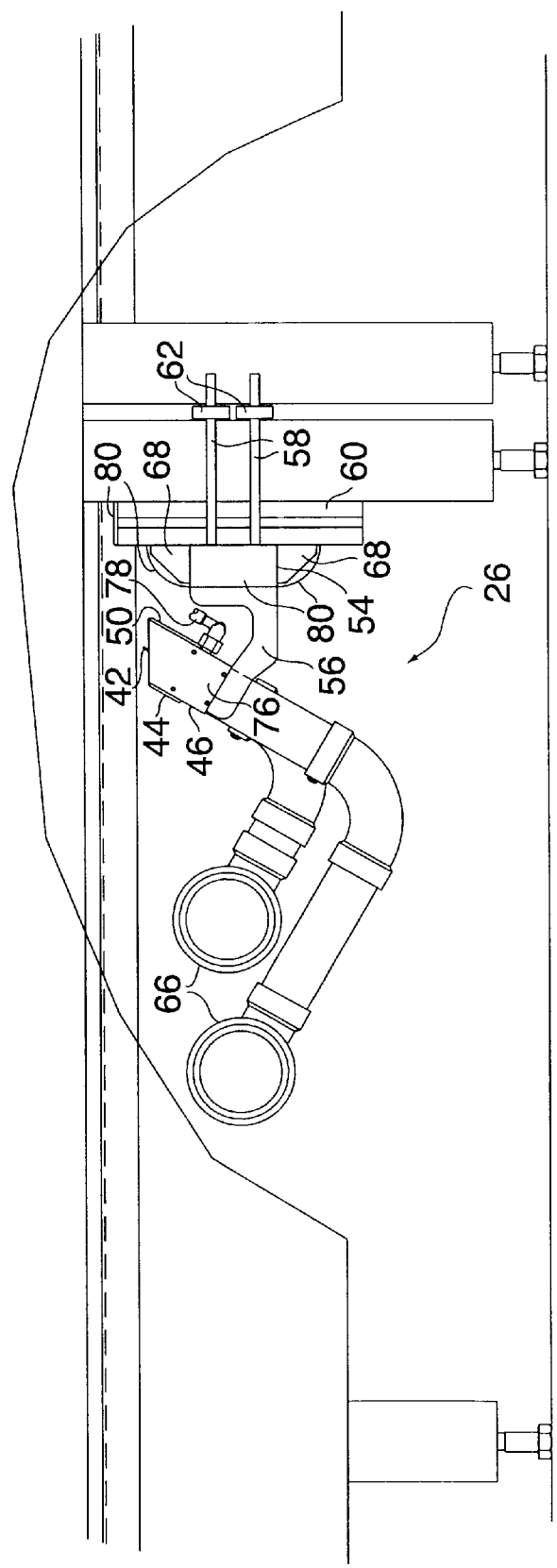
FIG. 5 is an elevational view including the vacuum and pressure fittings of the preferred embodiment of the cleaning apparatus.

FIG. 5 is a profile view of the cleaning station 26 presented to show the relative heights of the sides 44 and 50 of the vacuum inlet channel 46. The vacuum inlet channel 46 is adjusted so that the uppermost reach of its sides 44 and 50 lie from 0.05" below the free ends to flush with the free ends of the downward extending bristles. This keeps vacuum losses over the sides of the inlet channel 46 to a minimum and allows the vacuum to draw maximally from between the bristles, especially in the area of the enlarged space. The air needles 42 extend into the bristle bed as described above. The air needles 42 are generally hollow cylinders through which pressurized air is expelled through a discharge end 64. Ideally, the air needles define an outer diameter similar to the diameter of the bristles. Air needle diameters greater than double the diameter of the bristles require a significantly greater volume of pressurized air without removing appreciably more debris. The height of the air needles 42 is fixed relative to the vacuum inlet channel 46, but the height of the entire assembly is adjustable via the U-bolts 58. Angle brackets 68 are secured after the U-bolts 58 are tightened to prevent the cross support 54 from shifting due to continual pressure from the bristles and vibration from the cutting table machinery. FIG. 5 also depicts a vacuum fitting 66 and an air supply fitting 78. The preferred embodiment employs ten such fittings spaced laterally along the width of the bristle bed.

FIG. 6 shows an isolation view of the cleaner assembly from the section line 6—6 of FIG. 1, with the vacuum fittings 66 and the air supply fittings 78 omitted to clearly show the remaining components. FIG. 7 shows an isolation view of the same cleaner assembly from the section line 7—7 of FIG. 1, also with the vacuum fittings 66 and the air supply fittings 78 omitted. All components labeled on these illustrations are previously discussed.

FIG. 8 shows an exploded view of the cleaner assembly 26, wherein the air needles 42 are mounted within a needle support 70. The needle support 70 extends nearly to the tip or discharge end of the air needles 42 to strengthen them against being bent by the oncoming bristle free ends, and also holds the air needles 42 in place. The air needles 42 are grouped in ten equal sections with a small space dividing them, the space corresponding to the gap between longitudinal rows of bristle blocks in the bristle bed. Each section may be thought of as an independent component separate from the other sections of air needles, as air pressure applied to one section does not pass into other sections. A needle mounting tube 72 receives sections of air needles 42 and serves as a manifold for each of them. The mounting tube 72 comprises ten manifolds corresponding to the ten sections of air needles 42, with no air passageway directly between manifolds once assembled. The needle mounting tube 72 mounts on a plurality of vacuum channel partitions 74 that increase the structural rigidity of the inlet channel 46. The partitions 74 also serve to elevate the mounting tube 72, the air needles 42, and the needle support 70 so as not to obstruct the vacuum ports 52. Two end plates 76 form the lateral ends of the inlet channel 46.

Ten air supply fittings 78 penetrate one side of the inlet channel 46 at regular intervals to supply pressurized air from an exterior source to the needle mounting tube 72. Each air supply fitting 78 supplies air to one of the manifolds within the mounting tube 72, and thereby to a corresponding section of air needles. Pressurized air from an external source is fed to each of these air fittings on an alternating basis by an external controller (not shown) to reduce the volume of air required for effective cleaning. If the air needle sections are numbered sequentially 1 through 10, the controller will allow air, for example, to the pairs of sections 5 & 6, then 4 & 7, then 3 & 8, then 2 & 9, and finally 1 & 10. This serial porting of air to different symmetrical sections is then repeated cyclically. Pressurized air may be provided to any number of air needle sections at a given time, from a single section to all ten depending upon several factors. These factors include the amount of air pressure and volume available, the depth of the bristles that make up the bed (i.e.: 1.6", 1", 0.5", etc.), and the material being worked by the cutter. Simple testing may optimize these parameters for any given application and given air supply, and ten sections of air needles has proven quite flexible for a wide variety of work materials and air compressors.

A vacuum manifold runs the length of the vacuum inlet channel 46 underneath the vacuum ports 52. The vacuum ports 52 are not divided into sections as the air needles 42 are, so all vacuum ports 52 draw continuously. The vacuum manifold is connected to a vacuum source in the preferred embodiment that is the same source as that providing vacuum to the bristle bed itself. A valve and filter imposed on a distribution line connecting the manifold on the vacuum inlet channel 46 to the vacuum source isolates this branch from the rest of the cutting machine vacuum system. The vacuum and air needle sub-assembly described above is mounted via a plurality of cleaner brackets 56 onto a cross support 54. The cross support 54 is held to a carriage mount 60 at each end by a pair of U-bolts 58 with backing plates 62, the carriage mount being fixedly attached to an unmoving portion of the sheet material cutting machine itself. A pair of angle brackets 68 flanks each end of the cross support 54. Several finishing caps 80 are installed for cleanliness and aesthetics.

By the above description, it is apparent there are no moving parts in the bristle bed cleaner as described. This is considered a great advantage in that maintenance is reduced by the lack of wear on component parts. Of course, the compressor providing pressurized air to the air needles and the pump providing vacuum pressure to the vacuum ports entail moving parts, but are not considered components of the bristle cleaner station as claimed herein.

The method of cleaning a bristle bed in accordance with the above preferred and alternate apparatus is evident from the description. In short, the method comprises the following steps, the second step being optional:

1) invert a portion of a bristle bed so that certain of the bristles extend downwards;
2) temporarily bend a series of downwardly extending bristles to open up an enlarged space between several of the bristles;
3) direct pressurized air toward the enlarged space (if step 2 is employed) and the downwardly extending bristles to dislodge debris therebetween; and
4) provide a vacuum around the enlarged space (if step 2 is employed) and downwardly extending bristles to draw in and accumulate dislodged debris.

By the above method, the apparatus described above may be most effectively employed to clean a bristle bed. The present invention may be used to continually clean a bristle bed while sheet material is being cut on the support surface, or it may be used during a dedicated 'cleaning cycle' in which no sheet material is cut.

While the preferred embodiment and several modifications have been shown and described, additional various changes and substitutions will be apparent to those skilled in the art and may be made without departing from the spirit and scope of the present invention. The embodiment described above are hereby stipulated as illustrative rather than exhaustive.

What is claimed is:

1. A sheet material cutting machine comprising:
    at least one endless belt conveyor defining at least a portion of a bristle bed and including movable bristles having free ends defining a support surface,
    said movable bristles extending upwardly when so defining said support surface and extending downwardly during conveyor return movement; and
    a bristle cleaning station adjacent to a return run of the conveyor and including:
        a plurality of air jets directing pressurized air substantially upwardly into said downwardly extending bristles to dislodge debris; and
        a vacuum inlet chamber adjacent to both the air jets and to the downwardly extending bristle free ends to carry away dislodged debris, said vacuum inlet chamber being defined by an upwardly open channel with partitions in said channel that support said air jets.

2. The sheet material cutting machine of claim 1 wherein said air jets are positioned to impinge upon the free ends of at least some of said downwardly extending bristles.

3. The sheet material cutting machine of claim 2 wherein said air jets are arranged seriatim to span at least to span at least 70% of the width of said bristle bed conveyor.

4. The sheet material cutting machine of claim 3 wherein said vacuum inlet chamber is defined by an upwardly open channel that spans at least 70% of the width of said bristle bed conveyor.

5. The sheet material cutting machine of claim 1 wherein said air jets are defined as needles, the tips of which include a discharge end that defines a nozzle, said nozzle increasing the velocity of pressurized air discharged therethrough and directing pressurized air toward root ends of said bristles.

6. The sheet material cutting machine of claim 1 wherein said air jets are divided into at least two sections whereby pressurized air is discharged from less than all sections at a given time.

7. The sheet material cutting machine of claim 6 wherein said air jets are arranged seriatim to span at least to span at least 85% of a width of said bristle bed conveyor.

8. The sheet material cutting machine of claim 7 wherein said vacuum inlet chamber is defined by an upwardly open channel that spans at span at least 85% of the width of said bristle bed conveyor.

9. The sheet material cutting machine of claim 6 wherein said air jets are defined by air needles having discharge end nozzles, said discharge end nozzles having a diameter that measures less than twice the diameter of said bristles.

10. The sheet material cutting machine of claim 1 wherein said partitions are mounted within said channel.

11. The sheet material cutting machine of claim 1 wherein said bristle cleaning station is comprised entirely of non-moving parts.

12. A cleaning station for a section of a conveyorized bristle bed, said bristle bed having movable bristles with root ends and free ends, said free ends defining a support surface when said bristles extend upwards, said bristles otherwise extending downwards, said cleaning station comprising:
    a plurality of air needles arranged to span at least 70% of the width of said bristle bed section and directing pressurized air toward the root ends of the downwardly extending bristles to dislodge debris;
    said air needles defining nozzles that constrict the air flow discharged therefrom, each said nozzle defining a diameter less than twice a diameter of said bristles;
    said air needles being grouped into at least two sections wherein less than all sections discharge pressurized air at a given time; and
    a vacuum inlet chamber that creates a vacuum around the downwardly extending bristles to carry away the dislodged debris, said vacuum inlet chamber being defined by an upwardly open channel with partitions in said channel that support said air needles.

13. The cleaning station of claim 12 wherein said air needles extend to impinge said free ends of at least a portion of said downwardly extending bristles to riffle a plurality of them as said bristles move with the conveyorized bristle bed, said plurality of riffled bristles defining in part an enlarged space into which the air needles direct pressurized air.

14. A method for cleaning debris from between the bristles of a conveyorized bristle bed, said method comprising:
    a) inverting at least a segment of the bristle bed so that the bristles on said segment extend downwards;
    b) directing pressurized air from a plurality of air needles fixedly arranged seriatim to match the width of said bristle bed toward the downward extending bristles to dislodge debris accumulated between said bristles;
    c) providing a vacuum around the downward extending bristles to draw said debris away from said bristles and to accumulate said debris.

15. A method for cleaning debris from between the bristles of a conveyorized bristle bed, said method comprising:

a) inverting at least a segment of the bristle bed so that the bristles on said segment extend downwards;

b) temporarily bending a plurality of the downward extending bristles as said bristles move so that an enlarged space is defined between the temporarily bent bristles and adjacent bristles not so bent, said enlarged space being larger than a corresponding space between unbent bristles;

c) directing pressurized air toward the enlarged space to dislodge debris accumulated between said bristles;

d) providing a vacuum around the downward extending bristles to draw said debris away from said bristles and to accumulate said debris.

* * * * *

UNITED STATES PATENT AND TRADEMARK OFFICE
CERTIFICATE OF CORRECTION

PATENT NO. : 6,732,854 B2
DATED : May 11, 2004
INVENTOR(S) : Richard Kuchta et al.

It is certified that error appears in the above-identified patent and that said Letters Patent is hereby corrected as shown below:

<u>Column 7,</u>
Line 60, please delete "to span at least".

<u>Column 8,</u>
Line 9, please delete "to span at least".
Line 14, please delete "at span".

Signed and Sealed this

Seventh Day of September, 2004

JON W. DUDAS
*Director of the United States Patent and Trademark Office*